US008885559B2

(12) United States Patent
Schmidt et al.

(10) Patent No.: US 8,885,559 B2
(45) Date of Patent: Nov. 11, 2014

(54) METHOD AND APPARATUS FOR RELIABLE COMMUNICATIONS IN UNDERGROUND AND HAZARDOUS AREAS

(75) Inventors: Paul E. Schmidt, Forest, VA (US); James Edward Silverstrim, Forest, VA (US); Luke Koleszar, Lynchburg, VA (US)

(73) Assignee: Innovative Wireless Technologies, Inc., Lynchburg, VA (US)

( * ) Notice: Subject to any disclaimer, the term of this patent is extended or adjusted under 35 U.S.C. 154(b) by 208 days.

(21) Appl. No.: 13/257,369

(22) PCT Filed: Mar. 20, 2009

(86) PCT No.: PCT/US2009/037753
§ 371 (c)(1),
(2), (4) Date: Sep. 19, 2011

(87) PCT Pub. No.: WO2010/107440
PCT Pub. Date: Sep. 23, 2010

(65) Prior Publication Data
US 2012/0011365 A1    Jan. 12, 2012

(51) Int. Cl.
*H04W 24/02*    (2009.01)
*H04L 12/28*    (2006.01)
(Continued)

(52) U.S. Cl.
CPC ............. *H04W 84/18* (2013.01); *G01D 21/00* (2013.01); *H04W 88/16* (2013.01)
USPC .... 370/328; 370/406; 340/539.13; 455/404.2

(58) Field of Classification Search
CPC ....... H04L 67/12; H04L 67/18; H04M 11/04; H04M 11/00; H04M 11/002; H04M 11/007; H04M 11/06; H04M 3/42348; H04W 84/18; H04W 4/02; H04W 4/22; H04W 76/007; H04W 16/20; H01Q 1/04

USPC ............. 370/406, 310, 328, 338; 455/404.2; 340/539.13, 539, 573.1, 521.1, 501
See application file for complete search history.

(56) References Cited

U.S. PATENT DOCUMENTS

| 4,476,574 A | 10/1984 | Struven |
| 4,777,652 A | 10/1988 | Stolarczyk |

(Continued)

FOREIGN PATENT DOCUMENTS

| GB | 2235336 A | 2/1991 |
| WO | 2005043930 A | 5/2005 |

(Continued)

OTHER PUBLICATIONS

International Preliminary Report on Patentability of International Application No. PCT/US09/37753, dated Sep. 20, 2011, 10 pages.

(Continued)

*Primary Examiner* — Wutchung Chu
(74) *Attorney, Agent, or Firm* — New River Valley IP Law, PC; Michele L. Mayberry

(57) ABSTRACT

A method and apparatus for reliable wireless voice, data and location communication for deployment in underground, industrial and other hazardous environments using a wireless mesh network. The network includes protocol for dispatch operation, emergency operation, remote supervision, remote status, asset control, machine state of health and operational management. The architecture is based on localized clusters of autonomous nodes capable of ad hoc interconnection with nearby nodes and connection to gateway nodes. The resulting network is an ad hoc mesh topology comprised of fixed mesh nodes with approximately 50% coverage overlap between nodes. This provides a reliable communication network for mobile nodes carried by personnel and sensor nodes that are fixed or mobile that supports voice, data and tracking/situation awareness. Each cluster of nodes transfers digital voice and data to gateway nodes either directly or through multi-hop transactions.

7 Claims, 7 Drawing Sheets

(51) Int. Cl.
  *H04B 7/00* (2006.01)
  *G08B 21/18* (2006.01)
  *H04W 4/02* (2009.01)
  *G01D 21/00* (2006.01)
  *H04W 84/18* (2009.01)
  *H04W 88/16* (2009.01)

(56) References Cited

U.S. PATENT DOCUMENTS

| | | | |
|---|---|---|---|
| 5,020,135 | A | 5/1991 | Kasparian et al. |
| 5,230,080 | A | 7/1993 | Fabre et al. |
| 5,390,351 | A | 2/1995 | Di Giulio et al. |
| 5,432,838 | A * | 7/1995 | Purchase et al. ............... 455/523 |
| 5,504,809 | A | 4/1996 | Chalmers et al. |
| 5,603,080 | A | 2/1997 | Kaellander et al. |
| 5,635,907 | A * | 6/1997 | Bernard et al. ............ 340/573.4 |
| 5,697,067 | A | 12/1997 | Graham et al. |
| 5,952,940 | A | 9/1999 | Matsumoto |
| 5,987,328 | A | 11/1999 | Ephremides et al. |
| 6,041,042 | A | 3/2000 | Bussiere |
| 6,049,826 | A | 4/2000 | Beser |
| 6,075,798 | A | 6/2000 | Lyons et al. |
| 6,195,561 | B1 | 2/2001 | Rose |
| 6,226,389 | B1 | 5/2001 | Lemelson et al. |
| 6,324,395 | B1 | 11/2001 | Khayrallah et al. |
| 6,339,709 | B1 | 1/2002 | Gladwin et al. |
| 6,359,871 | B1 | 3/2002 | Chung et al. |
| 6,393,105 | B1 | 5/2002 | Beveridge |
| 6,553,130 | B1 | 4/2003 | Lemelson et al. |
| 6,744,754 | B1 | 6/2004 | Lee |
| 6,822,975 | B1 | 11/2004 | Antosik et al. |
| 6,850,502 | B1 | 2/2005 | Kagan et al. |
| 6,879,574 | B2 | 4/2005 | Naghian et al. |
| 7,016,377 | B1 | 3/2006 | Chun et al. |
| 7,024,157 | B2 | 4/2006 | Waye et al. |
| 7,043,195 | B2 | 5/2006 | Bunton et al. |
| 7,043,204 | B2 | 5/2006 | Reagor et al. |
| 7,050,831 | B2 | 5/2006 | Meiksin et al. |
| 7,110,756 | B2 | 9/2006 | Diener |
| 7,119,676 | B1 | 10/2006 | Silverstrim et al. |
| 7,149,472 | B2 | 12/2006 | Reagor et al. |
| 7,171,168 | B2 | 1/2007 | Weiss |
| 7,376,389 | B2 | 5/2008 | Bassiri et al. |
| 7,983,685 | B2 | 7/2011 | Silverstrim et al. |
| 8,244,260 | B2 | 8/2012 | Silverstrim et al. |
| 8,280,621 | B2 | 10/2012 | Edwards et al. |
| 8,385,322 | B2 | 2/2013 | Colling et al. |
| 8,527,172 | B2 | 9/2013 | Moshchuk et al. |
| 2004/0022416 | A1 | 2/2004 | Lemelson et al. |
| 2004/0090943 | A1 | 5/2004 | Da Costa et al. |
| 2004/0102219 | A1 | 5/2004 | Bunton et al. |
| 2004/0236547 | A1 * | 11/2004 | Rappaport et al. ................ 703/2 |
| 2004/0266497 | A1 | 12/2004 | Reagor et al. |
| 2005/0079842 | A1 | 4/2005 | Shi |
| 2006/0015674 | A1 | 1/2006 | Murotake |
| 2006/0019679 | A1 * | 1/2006 | Rappaport et al. ......... 455/456.5 |
| 2006/0046642 | A1 | 3/2006 | Bassiri et al. |
| 2006/0148514 | A1 | 7/2006 | Reagor et al. |
| 2007/0019561 | A1 | 1/2007 | Peterson |
| 2007/0021915 | A1 | 1/2007 | Breed et al. |
| 2007/0073861 | A1 * | 3/2007 | Amanuddin et al. ......... 709/224 |
| 2007/0129081 | A1 | 6/2007 | Seo et al. |
| 2007/0161352 | A1 * | 7/2007 | Dobrowski et al. ............. 455/69 |
| 2007/0165569 | A1 | 7/2007 | Kaminski et al. |
| 2007/0174467 | A1 * | 7/2007 | Ballou et al. .................. 709/227 |
| 2007/0287474 | A1 * | 12/2007 | Jenkins et al. ............. 455/456.2 |
| 2008/0019328 | A1 | 1/2008 | Rudnick |
| 2008/0031169 | A1 | 2/2008 | Shi et al. |
| 2008/0076383 | A1 * | 3/2008 | Barrett et al. ............... 455/404.1 |
| 2008/0137589 | A1 | 6/2008 | Barrett ......................... 370/327 |
| 2008/0137624 | A1 | 6/2008 | Silverstrim et al. |
| 2008/0143513 | A1 * | 6/2008 | Hannah ........................ 340/532 |
| 2008/0205417 | A1 | 8/2008 | Li |
| 2008/0219094 | A1 | 9/2008 | Barakat |
| 2008/0240209 | A1 | 10/2008 | Levan |
| 2008/0261520 | A1 | 10/2008 | Bassiri et al. |
| 2009/0016305 | A1 | 1/2009 | Lee et al. |
| 2009/0046675 | A1 * | 2/2009 | Pratt et al. ..................... 370/337 |
| 2009/0140852 | A1 * | 6/2009 | Stolarczyk et al. ...... 340/539.13 |
| 2009/0161687 | A1 | 6/2009 | Yu et al. |
| 2009/0170459 | A1 | 7/2009 | Karaoguz |
| 2010/0105317 | A1 | 4/2010 | Palanki et al. |
| 2012/0008542 | A1 | 1/2012 | Koleszar et al. |
| 2012/0011365 | A1 | 1/2012 | Schmidt et al. |
| 2013/0278440 | A1 | 10/2013 | Rubin et al. |

FOREIGN PATENT DOCUMENTS

| | | |
|---|---|---|
| WO | 2008049170 A | 5/2008 |
| WO | 2009018212 A | 2/2009 |
| WO | 2010107440 A | 9/2010 |
| WO | 2010107441 A | 9/2010 |

OTHER PUBLICATIONS

International Preliminary Report on Patentability of International Application No. PCT/US09/37755, dated Sep. 20, 2011, 9 pages.
International Search Report of International Application No. PCT/US09/37753, dated May 20, 2009, 2 pages.
International Search Report of International Application No. PCT/US09/37755, dated Jun. 9, 2009, 3 pages.

* cited by examiner

METHOD AND APPARATUS FOR RELIABLE COMMUNICATIONS IN UNDERGROUND AND HAZARDOUS AREAS

CROSS-REFERENCE TO RELATED APPLICATIONS

This application is a U.S. National Stage application of International Application No. PCT/US09/37753, filed Mar. 20, 2009, the disclosure of which is hereby incorporated by reference herein in its entirety.

TECHNICAL FIELD

The present invention relates to an intrinsically safe wireless voice and data communication system developed for use in underground and hazardous areas for dispatch, remote supervision, and tracking of personnel, as well as, monitoring, asset control, and management of wireless sensors and equipment. More specifically, it provides for the creation of a reliable wireless ad hoc mesh network architecture and protocol to support normal and emergency operation.

BACKGROUND OF THE INVENTION

Recent events have emphasized the need for reliable communication systems during emergencies in underground and hazardous work areas such as coal mines. During a mine disaster, the current voice and data communication system usually fails or is shut down to prevent an explosion so the conditions of personnel, environment and equipment in the area is unknown which complicate recovery efforts. Past mining accidents have demonstrated that current communication systems are not sufficient to provide the support required to effectively handle evacuation and rescue operations. The 2006 MINER Act amends the Federal Mine safety and Health Act of 1977 stating underground coal mine operators must provide for post accident communication between underground and surface personnel via a wireless two-way medium within three years. The 2006 MINER Act also requires an electronic tracking system in order for surface personnel to determine the location of any person trapped underground. Robust and reliable communications are critical for both normal operations and in the event of an emergency. The National Institute for Occupational Safety and Health (NIOSH) released a solicitation in late 2006 for an underground communication system that is highly reliable and provides in-mine and mine-to-surface voice and data communications based on wireless mesh network technology as part of an underground communications system.

Methods of wireless communications above ground are not effective in mines, tunnels and other underground facilities due to the environment and limited radio wave propagation. Prior art communication systems for underground use include Leaky Feeder systems, wireline repeater systems, wireless repeaters systems and through-earth radio systems.

Leaky Feeder systems consist of one or more base stations above ground with leaky feeder coax cable below ground that distributes an RF signal between above ground base stations and mobile radios below ground to provide voice and data communications to personnel. The Leaky Feeder system has built in RF amplifiers at regular intervals in the coax cable to extend the distance that can be covered by the system. The distance from the Leaky Feeder cable to a mobile radio in an underground mine is limited to 50-150 feet depending on location of the RF amplifier and the environment. The Leaky Feeder base stations are connected to an Operations Center above ground. In the event of a disaster, Leaky Feeder coax cable is often damaged underground which prevents communications from the base stations to the mobile radios. Unless the Leaky Feeder system is approved by Mine Safety and Health Administration (MSHA) for operating in a hazardous environment, it is automatically shut down during an emergency.

Wireline RF repeater communication systems operate similarly to Leaky Feeder systems except a low loss coax cable interconnects to a series of underground RF repeaters which communicate with the mobile radios. In the event of a disaster, the wired system is often damaged underground that prevents communication. Wireline RF Repeater systems have been replaced by Leaky Feeder system because the Leaky Feeder is more cost effective.

Wireless repeater systems are similar to wireline repeater systems except the low loss coax cable is replaced with wireless links to underground RF repeaters which can improve the link reliability in event of a disaster. However, all communications are still controlled by the aboveground base stations. If that connection is missing, underground communications are lost since the below ground units are simply repeaters.

Through-earth radio systems that operate at very low frequency have been experimented with but have not been proven to be reliable and cost effective.

No single prior art for use in a underground mine or hazardous area has the ability to provide a reliable voice and data communications network, reform and provide redundant paths, interface to wired communications, and provide location information of personnel in the hazardous area as specified by 2006 Miner Act and NIOSH.

Existing wireless mesh networking with an IP network layer include the IEEE 802.11 standard and IEEE 802.15.1 (Bluetooth). Both standard technologies perform an excellent role for which they were designed. However, the link protocols do not form the desired network topology to achieve an optimal mesh deployment solution. The use of the 2.4 GHz unlicensed RF spectrum band allows fast deployment anywhere, anytime, but may not meet reliability requirements for critical communications. These bands are not dedicated and can be jammed by other commercial users. In addition, operation in the 2.4 GHz band provides a higher cost solution due to less RF coverage per FMN in an underground environment.

Thus, there is a need to develop a cost effective wireless communication system with reliable underground voice and data network. An intrinsically safe low cost wireless ad hoc mesh network with battery backup and approval for deployment in hazardous environments can achieve such a solution. A complete wireless communication network includes mesh network routers that operate below ground with access points above ground that connect to external networks to provide dispatch, collaborative detection, location, assessment, and tracking during emergency events as well as normal operation. Nevertheless, there are several technical issues with current wireless networks which need to be addressed: high reliability network architecture, placement of fixed wireless nodes for reliable coverage, scalability to support a large network, selection of radio RF frequency, and waveform protocol for communication and tracking of personnel.

SUMMARY OF THE INVENTION

This invention relates to a system and method for maintaining reliable voice and data communications with personnel and sensors within the underground or hazardous area and also with a remote operation center during an event that requires shut down of normal operations. The system allows rescue teams to determine personnel status, where personnel are located, and environment conditions such as water, toxic gases, and oxygen availability in the underground or hazardous area.

The system provides an automatically self-configuring, scalable RF wireless data and voice communications system of multi-waveform nodes organized within at least one ad hoc wireless mesh network (WMN). This system is a reliable low cost wireless communication network for digital voice and data applications. The system includes at least one operations center for each WMN which incorporates a wide area network and network management and communication capabilities. At least one gateway node provides an interface from the WMN to the operations center. Each gateway node may also be connected to a wired backbone head end which, in turn, is connected to a wired backbone. A plurality of wireless fixed mesh nodes are operationally connected to at least one gateway. The system further includes at least one mobile mesh radio carried by personnel which communicate with at least one of the plurality of fixed mesh nodes. In addition, at least one wireless sensor mesh node is provided in the system which may be located in an underground or hazardous area.

The method of this invention relates to a process for managing a scalable communications system of multi-waveform nodes within at least one wireless mesh network that incorporates at least one fixed gateway node. The WMN also includes a plurality of stationary and mobile nodes. All of the nodes are initially configured to provide a known combination of waveforms and features. The locations of the gateway nodes and stationary nodes are optimized based on signal strength of the RF links and the traffic profile. Then, the location of each mobile node is determined based on a geolocation algorithm. Once operation commences, the functioning of each WMN is supervised to ensure reliable operation of the nodes and to identify traffic congestion. If either of these problems is encountered, the nodes in the relevant WMN may be reconfigured manually or from the operation center.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE INVENTION

Figure 1:
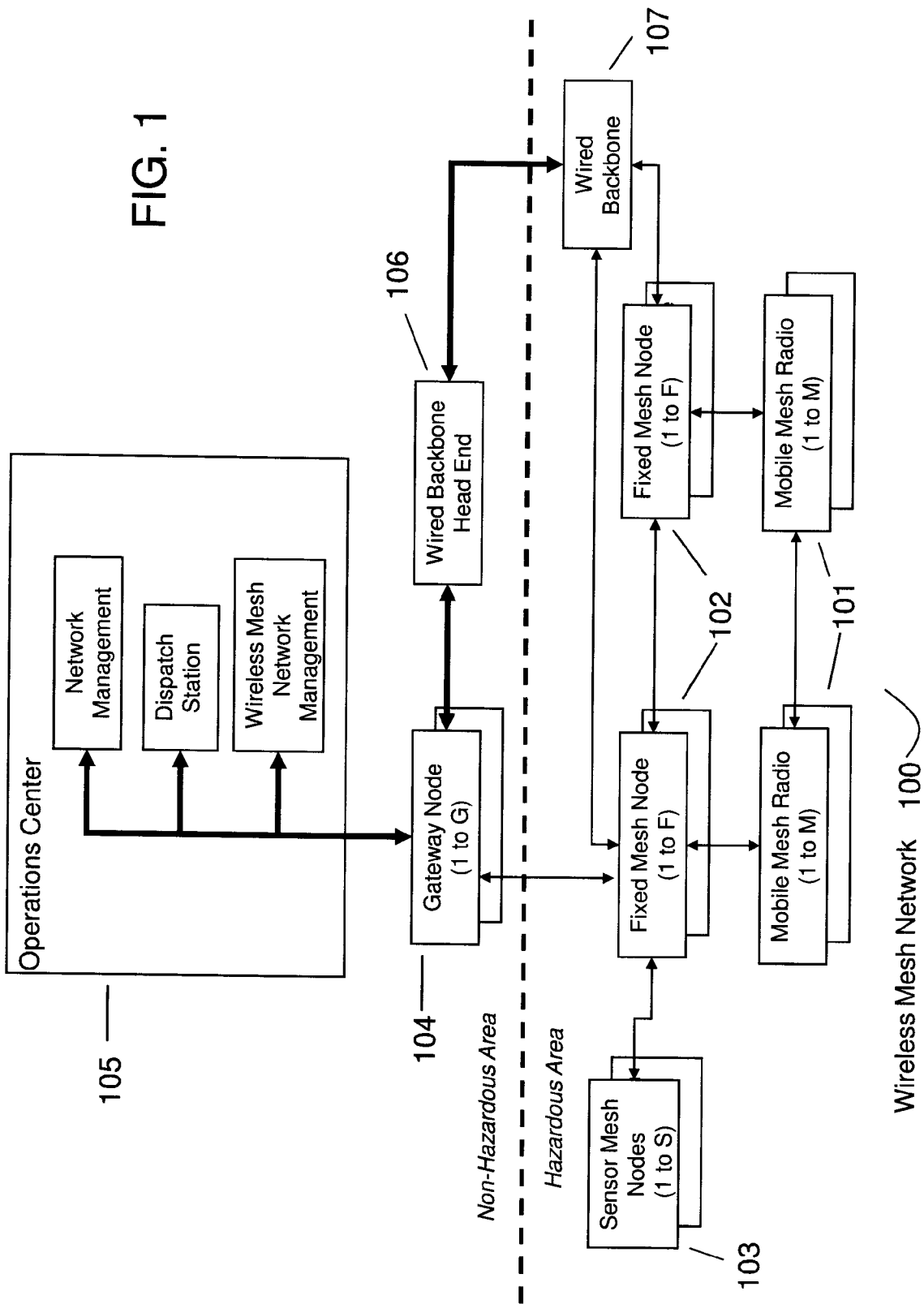
FIG. 1 illustrates the concept of a wireless voice and data mesh network deployment in a logical design block diagram view according to an embodiment of the present invention.

The present invention provides a mechanism for a scalable network based on a Wireless Mesh Network (WMN) 100, as shown in FIG. 1, having a multi-tier structure of nodes to provide voice and data communications, and detect and track events. The fixed mesh nodes (FMN) 102 provide the local access points and act as relays for information among the mobile mesh radios (MMR) 101 and the sensor mesh nodes (SMN) 103. In addition, Gateway Nodes (GWN) 104 operate above ground or sufficiently away from the hazardous area to provide interface to an external network for access to equipment in the Operations Center 105. GWN 104 provides a standard interface to a data network.

The present invention provides a self-forming wireless mesh network (WMN) 100 particularly suited for use in an underground or hazardous area that is formed of wireless nodes and can take advantage of existing wired links. The WMN is formed from the FMN, SMN, MMR and GWN. The WMN provides communications between multiple MMR's that support voice and data and SMN's that support data. The GWN provides external communication interface to the Operations Center 105 for command and control. This allows personnel in the operations center to communicate with personnel in the underground or hazardous area, collect data from the sensor nodes in the area, provide voice dispatch, display information about the network and locations of MMR's. In an emergency event, the operations personnel can perform an assessment and then make decisions based on the knowledge. It also allows underground personnel with MMR's to continue communication with each other and with SMN's independent of the above ground connection.

The wireless voice and data network of the present invention is illustrated in a logical design block diagram form in FIG. 1 wherein a number of intercommunicating nodes form a wireless mesh network (WMN) 100 that can reform when links are removed or blocked. The Fixed Mesh Node (FMN) 102 and Sensor Mesh Node (SMN) 103 units are designed to be continuously charged during normal operation and utilize a backup power source such as a battery in the event normal power is interrupted. Because of the potentially explosive atmosphere that can be present in an underground mine or hazardous area, typically all power feeding into the area is removed if a disaster or emergency occurs, thus the need for a backup power source local to the mesh nodes. Mobile Mesh Radio (MMR) 101 is battery-powered because it is intended to be a portable device. Each Gateway Node (GWN) 104, of which there is at least one, can have mains power and backup power. Since the Gateway Node is typically in a "safe" area, a battery backup may not be required. Other units such as a mobile pager, tracking tag or equipment data node may be added to WMN 100 if necessary or useful, and this invention is not limited to the node types specifically mentioned.

A significant aspect of the present invention is the provision of wireless voice and data communications using an intrinsically safe low cost ad hoc mesh network. The wireless network can be used for communications where conventional wireless devices such as cell phones or emergency mobile radios designed for above ground "line of sight" are useless or of limited value at best. Characteristics of the wireless voice and data network include:

integrated voice and data communications;
quick and easy deployment of fixed mesh nodes;
reliable data link operation;
maintaining reliable network operation with loss of one or more mesh nodes or paths;
flexibility for different deployment scenarios;
automatic adjustment to multiple background environments;
support for both pre and post-event scenarios;
comprehensive event detection, assessment and tracking;

data security and physical security;
multiple wireless sensor types that operate with the mesh network; and
centralized operation for dispatch, failure detection, maintenance, configuration and software upgrades;

1. Network Architecture

Figure 2:
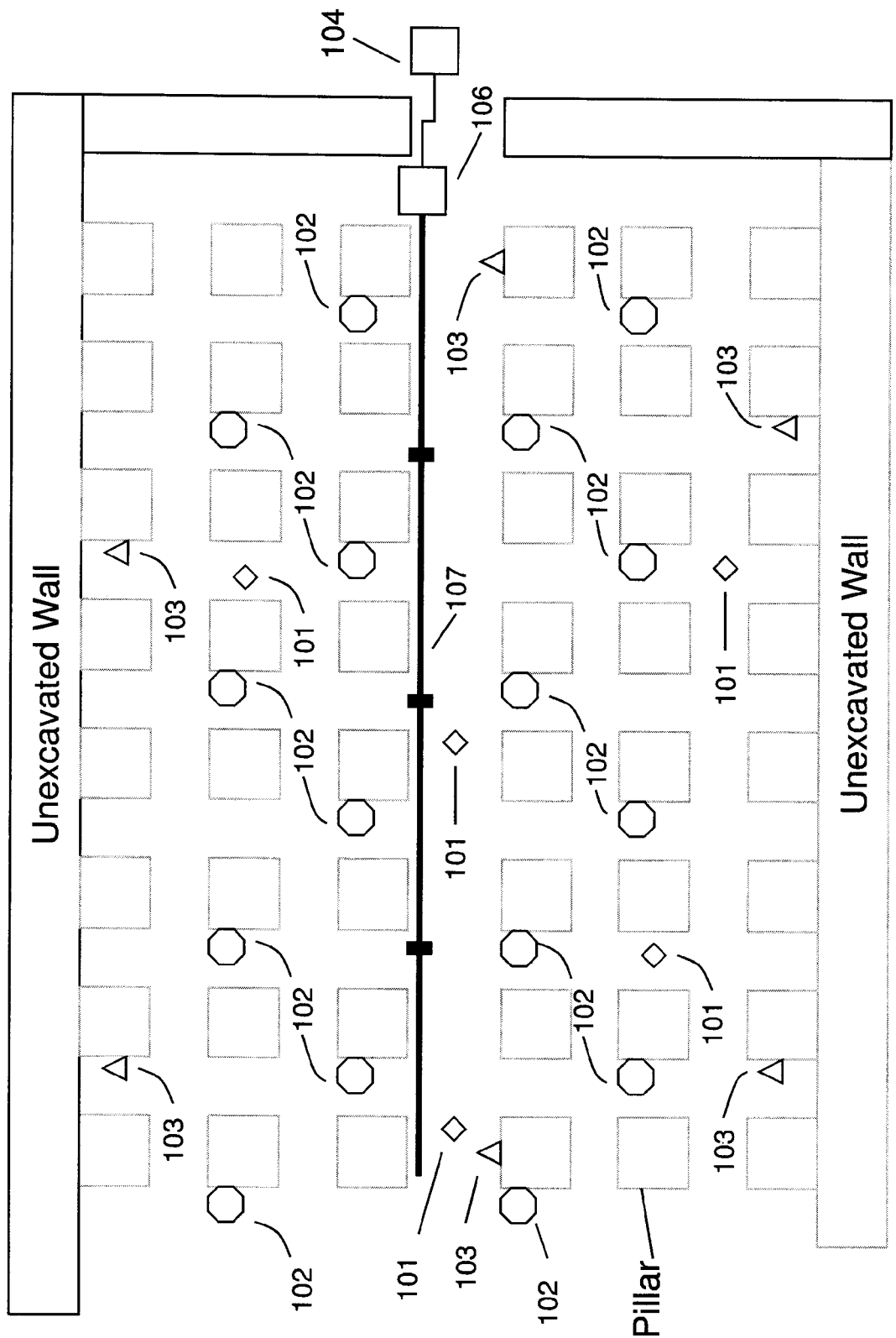
FIG. 2 illustrates the concept of a wireless voice and data mesh network deployment for a coal mine application according to an embodiment of the present invention.

A preferred embodiment of the present invention provides a reliable voice and data network, illustrated in FIG. 1, as a flexible architecture that serves as a communication platform for multiple deployment scenarios and sensor types. A Wireless Mesh Network 100, according to a preferred embodiment, can be deployed to cover an underground mine as shown in FIG. 2, in which the square blocks represent pillars found at the site, used in tunnels or for infrastructure pathways under a city or at a manufacturing site. Fixed Mesh Nodes (FMN) 102 form the basic voice and data wireless mesh network. The FMN's are placed at pre-determined locations throughout a mine or other hazardous area to provide communication with MMR's and SMN's. Each Fixed Mesh Node (FMN) 102 in the network acts as a "micro-router," and passes data from node to node. The FMN's act as relays for MMR's and SMN's that are in various locations in the underground or hazardous area. Typically, Fixed Mesh Nodes 102 have multiple mesh radio channels and are placed throughout a mine or other area to provide approximately 50% coverage overlap between nodes in a manner as to provide both wide coverage and multiple communication links. Thus, FMN's are placed in such a manner that if a nearest neighbor node becomes incapacitated, there is sufficient transmit power and receive sensitivity to connect with the next neighbor. Because there are numerous paths in the wireless mesh network, there are multiple paths to ultimately connect to a Gateway Node (GWN) 104. In addition, each FMN 102 can also connect through the wired backbone network 107 which in the illustrated embodiment is a Leaky Feeder system that is already in place. Network 107 is indicated as a thick line in FIG. 2 and may be implemented as a radiating coaxial cable with periodic amplifiers. The Leaky Feeder system normally operates at a different RF frequency spectrum than the Wireless Mesh Network. Mobile Mesh Radios 101 have one mesh radio channel and are carried by personnel for voice and data communications. The location of mobile mesh radios can be determined via triangulation methods based on signal strength and/or time of arrival measurements relative to the nearest active FMN 102. Sensor Mesh Nodes 103 also have one mesh radio channel and are placed where needed to monitor conditions, and over a wide enough area to provide information throughout the deployed area. For example, multiple wireless sensors nodes may be used to track one or more events to take an air sample and measure its properties. Each Gateway Node 104 typically has multiple mesh radio channels and provides an interface to an external wide area network. The fundamental capability of the wireless mesh network, in a preferred embodiment, is real-time operation capability and reliability. The system possesses the capability to rapidly detect, locate, characterize, report, track, and respond to events. Key aspects of this preferred embodiment are low cost, deployment flexibility of the system, seamless scalability from small to large networks, network redundancy, and reliability of communications if part of the network is removed by some event, especially a localized explosion, fire, flood, or collapse.

In a preferred embodiment, Gateway Nodes 104 are placed at two or more entry ways and in multiple paths to integrate the Wireless Mesh Network (WMN) 100 into public or private communication infrastructure types such as cellular, land mobile radio, wired IP or wireless IP access points. These GWN's 104 are typically spatially separated to provide reliable connection to the external network, although a system with one GWN is feasible. Knowing FMN locations and measuring the distance between an MMR and nearest FMN's, it is possible to determine the relative location of an MMR as well as communicate with a person carrying the MMR. Example communication standards for the communication infrastructure include cellular, IEEE 802.11, IEEE 802.16, Project 25, Ethernet, cable modems, and DSL. The Gateway Node provides transparent communications across different physical layers. In FIG. 2 only one Gateway Node 104 is shown while a second or more gateway nodes are assumed to exist at other entry points but are not shown.

In a preferred embodiment, Gateway Node 104 can dynamically re-assign and reconfigure the communication infrastructure medium based on available services. When one network is at capacity, unavailable, or damaged, a GWN can automatically re-route information via an alternate protocol.

Also in a preferred embodiment, local servers in the at least one Operations Center 105 provide node network management functions such as Dynamic Host Configuration Protocol (DHCP) for Internet Protocol (IP) address assignment, Simple Network Management Protocol (SNMP) for device control, and security through an Electronic Key Management System (EKMS). Provisioning of the network bandwidth and network traffic optimization that is unique to the WMN clusters is controlled from the local server. The provisioning ensures sufficient Quality of Service (QoS) is maintained in the local wireless mesh network WMN such that voice and data during high traffic events do not flood the available bandwidth on the infrastructure communication system.

2. Wireless Mesh Local Area Network Architecture

The system and method of the present invention provides a voice and data network to supply above ground and underground personnel with voice communication, event detection information, and personnel location information, as illustrated in FIG. 1. In a preferred embodiment, four types of nodes are provided in the network.

Figure 3:
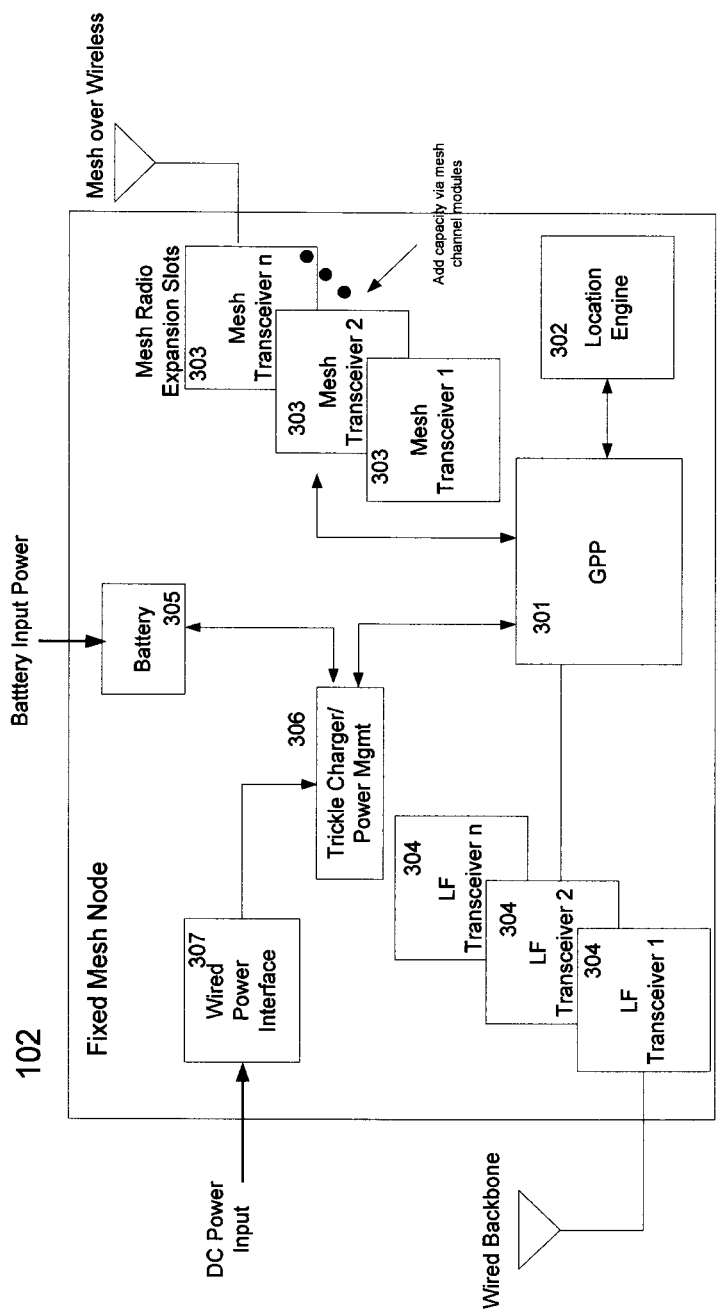
FIG. 3 illustrates the concept of a Fixed Mesh Node in a logical design block diagram view according to an embodiment of the present invention.

Full function Fixed Mesh Node (FMN) 102, illustrated in logical design block diagram form in FIG. 3, operates on the WMN 100. Each FMN 102 has the capability to coordinate individual piconets (subnets) within the wireless mesh network WMN 100 and route data through the network to GWN 104 access points. A FMN 102 can operate from an AC or DC power source and may include battery backup. Most often in a mine or hazardous area, the back-up power source is a sealed battery in a hardened case. The FMN can also communicate with a wired network such as the leaky feeder system common in mines as well as form the core links for the wireless mesh network WMN 100.

Figure 4:
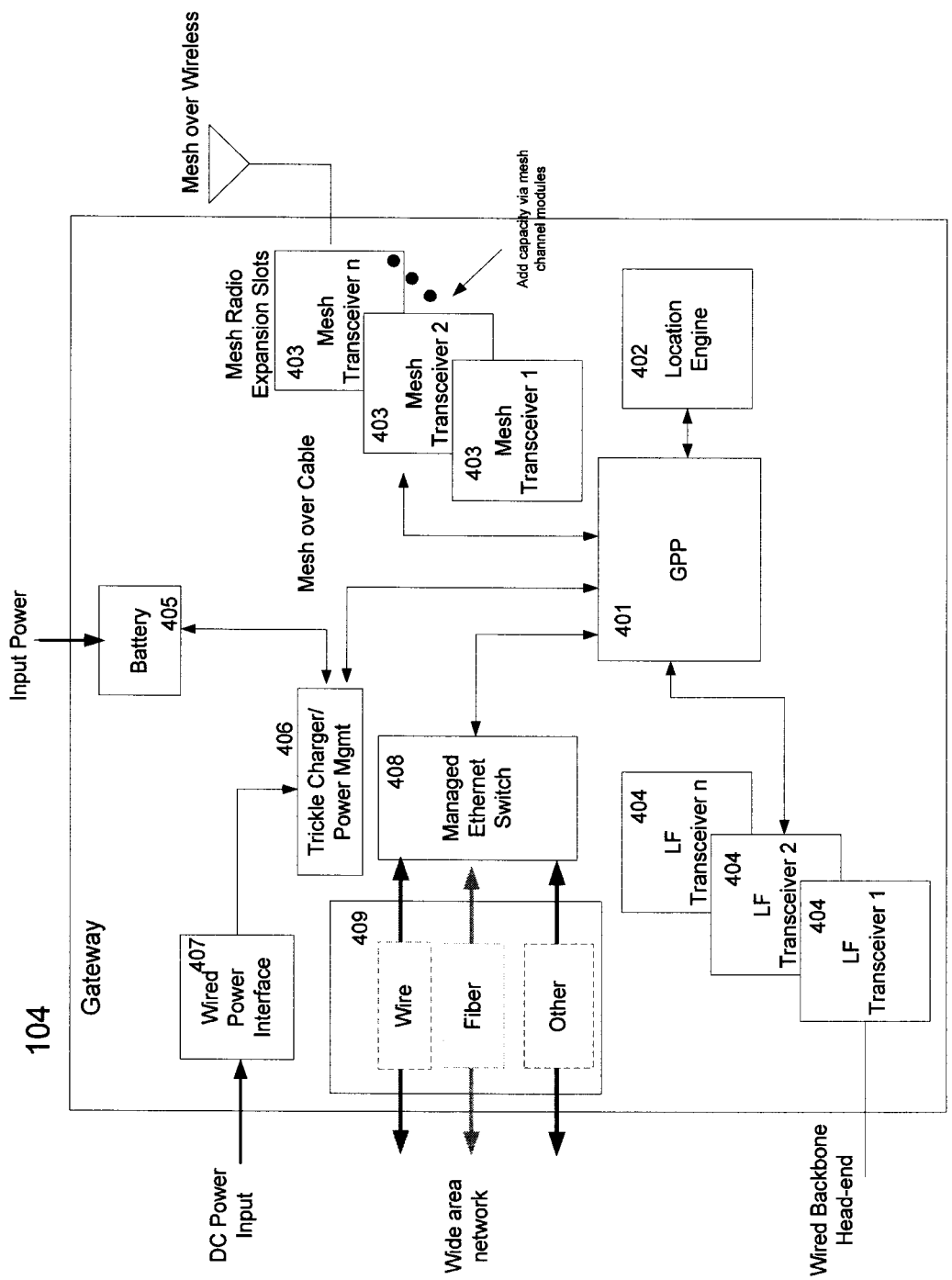
FIG. 4 illustrates the concept of a Gateway Node in a logical design diagram block view according to an embodiment of the present invention.

Gateway Node (GWN) 104, illustrated in logical design block diagram form in FIG. 4, supports the transfer of information between the WMN and wide area network WAN infrastructure. It is a highly modular design that is normally implemented as a fixed device but could be a mobile device. A GWN includes all of the functions of an FMN and the wide area network interface. It operates from either an AC or DC power source which may further include battery backup.

Figure 5:
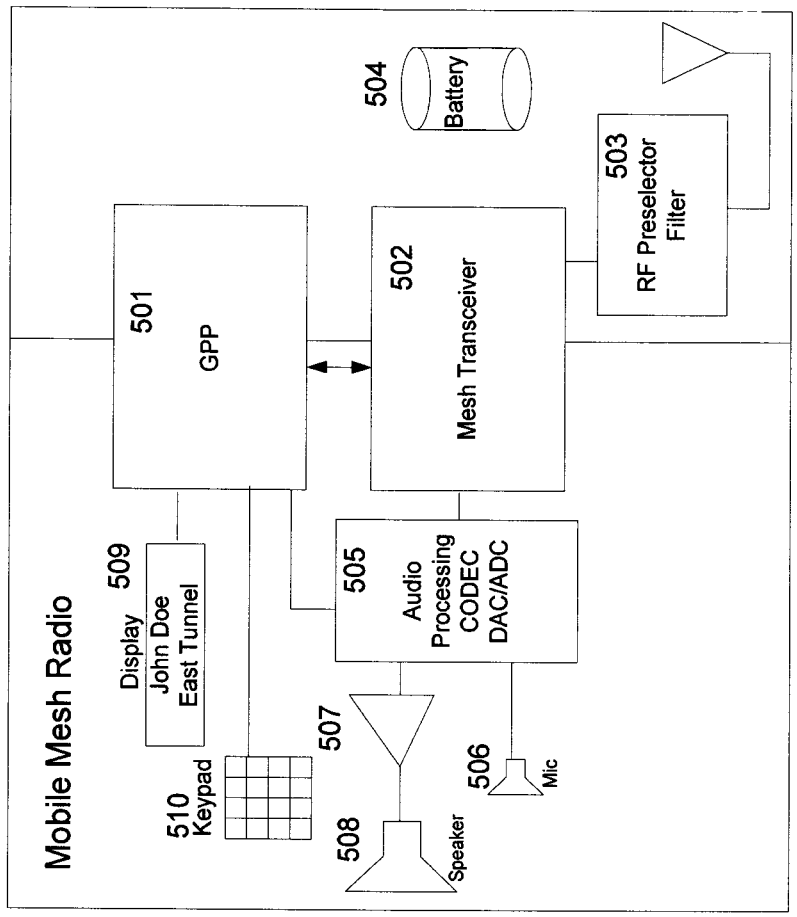
FIG. 5 illustrates the concept of a Mobile Mesh Node in a logical design diagram block view according to an embodiment of the present invention.

Mobile Mesh Radio (MMR) 101, as illustrated in logical design block diagram form in FIG. 5, is a portable device carried by personnel that allows them voice and data communication via the FMN and GWN with Operations Center 105 and/or other personnel equipped with an MMR. An MMR can also provide direct communication to another MMR or SMN when an FMN or GWN link is not available.

Figure 6:
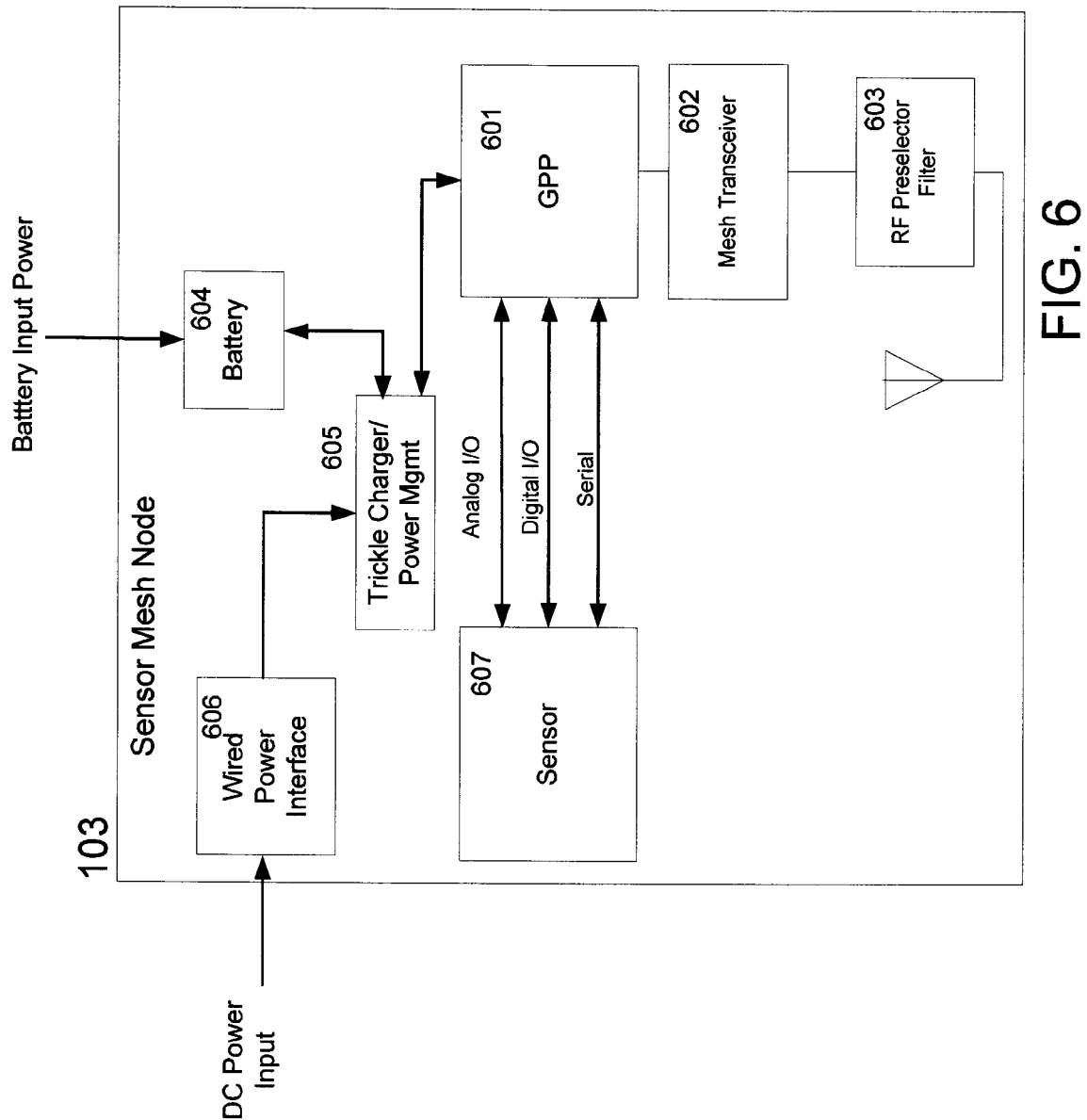
FIG. 6 illustrates the concept of a Sensor Mesh Node in a logical design block diagram view according to an embodiment of the present invention.

Sensor Mesh Node (SMN) 103, as illustrated in logical design block diagram form in FIG. 6, connects data from various types of sensors such as light, noxious gas, acoustic, temperature, oxygen, and imaging sensors into the wireless mesh network by communicating via an FMN or GWN. The SMN operates on AC or DC power with battery power for backup. This does not preclude portable versions of an SMN that are battery powered only which could be additions in emergency situations or for flexibility in other situations. An SMN can also communicate directly to an MMR when an FMN or GWN link is not available.

FMN 102 obtains information such as distance and unit identification from MMR's 101 and SMN's 103. This information is passed through the network to Operations Center 105 and the computer in Operations Center 105 is then able to provide a visible indication to the operator as to the location of these units.

FMN 102 is powered from a DC power source with battery backup at a fixed location. FMN 102 are mid-tier nodes capable of operating as a peer-to-peer architecture. FMN's provide piconet coordination and interconnect to any wired backbone such as a leaky feeder. The FMN and GWN nodes possess sufficient processing capabilities to perform correlation of sensor detection data thus increasing the probability of detection while decreasing the probability of false positives. They also provide relative location information necessary to locate the Mobile Mesh Radios (MMR) 101 and portable Sensor Mesh Nodes (SMN) 103 that might be present. A Mobile FMN 102 powered from a battery is useful in maintaining the wireless mesh network WMN 100 connection in an emergency event where mesh network coverage is expanded. The mobile FMN should provide at least 24 hours of operation on fully charged battery.

GWN 104 is a high tier node that is powered from commercial AC with battery backup in fixed location. A networked GWN provides a very flexible design for use in multiple scenarios where it is necessary to maintain connectivity between WMN 100 and a wide area network and Operations Center 105. A backup mobile GWN 104 powered from a battery or DC feed is useful in maintaining a WMN 100 connection to a wide area network and Operations Center 105.

Mobile Mesh Radios MMR 101 are mid-tier, battery powered portable devices. Each person has an MMR for communication. The MMR has capability for supporting voice by converting the audio input to outgoing digital data, and incoming voice data to audio. The MMR has capability for supporting data by converting keypad inputs to outgoing digital data, and converting incoming data to an alphanumeric display, audio tones or visual indicator. Use scenarios for these nodes include voice and data exchange with other users and dispatch, and MMR location relative to FMN/Gateway. MMR communications are coordinated through Fixed Mesh Nodes FMN or Gateway Nodes GWN. The battery can be easily removed for charging or replacement. MMR's can communicate with other MMR's and SMN's in talk-around mode to allow local communication when out of range of an FMN. An MMR can also act as a relay link between another MMR and a FMN, or between an SMN and a FMN to extend communication range.

Sensor Mesh Nodes SMN 103 are low tier, low cost, small size, and low power devices. SMN's are deployed at fixed locations and coupled with low cost, low power sensors. Use scenarios for these nodes include wireless sensors for environmental monitoring, event detection, and post-event tracking. Communication with SMN's are coordinated through FMN 102, GWN 104 or MMR 101. This configuration forms a classic master-slave star topology between a higher tier node and SMN 103. A mobile SMN 103 powered from a battery is conceived as a useful aid for event detection, smart tags to track mobile equipment and assets or rapid placement of fixed sensors for event detection, post-event tracking, and environmental monitoring. Mobile SMN 103 should provide at least 24 hours of operation on fully charged battery.

Reliable communications for a wireless voice and data network are provided by combining a reliable and secure RF physical layer with an ad-hoc networking data link layer that is self-configuring, energy efficient, and scaleable to variable size networks. The communication solution of this preferred embodiment:

ensures a reliable and secure RF physical layer connection;

exercises adaptable, interoperable waveforms that can satisfy many different deployment scenarios; and provides data link layer ad hoc networking that supports priority service, collaborative sensor fusion, and scalability to variable size networks.

The core communication functionality of each node type is effectively the same, but each tier progressively increases capability at the expense of increased cost and power consumption. The core framework layer provides a standardized technique for packaging voice and data packets for proper interpretation at all layers of the system. The core node stack follows the standard OSI model commonly found in most Internet-enabled devices. The key layers that require unique attention for the present invention are the physical layer, the ad-hoc link layer, and core framework layer. Choice of physical layer determines communication range, synchronization, power consumption, node cost, interference immunity (thus reliability), multipath performance, and data rate. The ad-hoc link layer controls automatic formation of the network topology, power control, and maintenance of reliable link connections within the network.

A key requirement for a reliable network solution is a distributed architecture and redundancy. Multiple data paths to decision-making authorities are required to ensure critical communications are achieved. The network of FMN's 102 of the present invention can be considered a network of micro-routers. Routing in the context of micro-routers faces many of the same challenges of traditional routers such as routing decisions, route discovery/repair, flow control, power control, etc. However, the size, power consumption, throughput, and processing capabilities of a micro-router are orders of magnitude smaller than a traditional router.

Ad-hoc networking protocols provide mechanisms for automatic configuration, rapid deployment, self-healing and redundant data routes, range extension, and energy efficient communications. The ad-hoc network passes data node-to-node throughout the network. This capability provides range extension and allows all fixed or mobile nodes to communicate with any other node in the network. The result is a highly redundant network with multiple routes to gateways that interface to existing infrastructure communication systems. Information is distributed to the responders roaming within the network and passed to Operations Center 105 via one or more Gateway Nodes 104. Gateway Nodes 104 are similar to Fixed Mesh Nodes 102 with added interface capabilities and software to support stack translation between various protocols. This arrangement achieves a totally integrated, widely distributed dispatch operation that serves as a communication platform for multiple sensor types and also serves as a rapid information dissemination system. Decision information passed back through the network or through traditional response channels provides on-scene commanders the best response information. Digital voice traffic is handled as special data with guaranteed delivery. In an alternative embodiment, data can also be passed to information signs, and can be used for coordination of entry and exit from the underground or hazardous area.

A limitation of a wireless mesh communication system is that each FMN node 102 adds a time delay to the voice and data packet of information. The system of this invention provides an additional interface via Wired Backbone 107 to limit the communications delay to an Operations Center 105. Each FMN node 102 has the capability of connecting to Wired Backbone 107 which may be implemented via a Leaky Feeder system or fiber optic system.

3. Multi-Waveform Nodes

In a preferred embodiment, the wireless voice and data network provides voice dispatch, data monitoring, and data control to detect and track events using widely distributed nodes organized as one or more ad hoc local area networks. The wireless voice and data network has four types of nodes
Gateway Node (GWN) 104;
Fixed Mesh Node (FMN) 102;
Mobile Mesh Radio (MMR) 101; and
Sensor Mesh Node (SMN) 103.

A preferred embodiment of the WMN nodes employs a software defined radio to leverage advanced processing technology to effectively replace multiple radios that support specific waveforms with one radio that supports multiple waveforms. This technology is based on a wideband transceiver coupled with a programmable processor and a standard software environment such that the radio can support multiple waveforms via software control. The system and method of the present invention through provision of an adaptable solution comprising a single hardware platform that supports multiple commercial waveforms in a software defined wideband RF transceiver implementation resolve the absence of dedicated spectrum, open physical layer, licensed spectrum availability and interference concerns in unlicensed bands. The waveforms supported in a preferred embodiment leverage existing wireless local area network waveforms to provide coverage in a time frame and at cost points not attainable with multiple independent solutions.

Gateway Node

Each Gateway node 104 comprises an embedded processor, one or more mesh radios, optional Leaky Feeder radios, managed Ethernet switch, wide area network interface, battery and power supply. Each such node processes Wireless Mesh Network voice and data packets and transfers information via the wide area network to Operations Center 105.

The logical decomposition of functionality of a preferred embodiment of the present invention is illustrated in FIG. 4. The embedded processor includes first digital General Purpose Processor (GPP) 401 and first Location Engine 402. An acceptable digital GPP for use wherever such equipment is called for in this invention would be a processor such as the Texas Instrument MSP430 or the Renesas M16C microcontroller. Each first mesh radio transceiver 403 includes a transmitter, receiver, RF switch and antenna connection. An acceptable mesh radio transceiver for use wherever such equipment is called for in this invention would be the Sentinel design offered by Innovative Wireless Technologies. Each first Leaky Feeder radio transceiver 404 includes a transmitter, receiver, RF switch and RF cable connection to Wired Backbone Head-end 106. An acceptable leaky radio transceiver for use wherever such equipment is called for in this invention would be the Sentinel design offered by Innovative Wireless Technologies, while an acceptable wired backbone head end would be an Intrinsically Safe Leaky Feeder system such as that offered by Varis Mine Technologies or an Intrinsically Safe Fiber Optic system such as that offered by R. Stahl. The power interface includes backup battery 405, trickle charger/power management 406 and wired power interface 407. During the loss of prime power, GWN 104 is capable of operating on battery power and retaining all configuration parameters stored or in operation at the time. The managed Ethernet Switch 408 provides a packet management switch between GPP 401 and wide area network interface 409. Each wide area network interface 409 includes one or more of the following: wired interface, fiber interface and wireless interface.

Physical interfaces are as follows:
Power I/O includes DC power, ground, and temperature sensor to power interface;
Wide area network I/O includes DC power, ground, and data where the actual interface will be dependent on the specific standard;
Mesh Radio I/O includes power, ground, RF signal; and
Leaky Feeder Radio I/O includes power, ground, RF signal.
There are also board level serial and/or Ethernet connections for software development, debug and factory programming.

First GPP 401 is the primary controller for the Gateway node. From a controller perspective it handles all power up initialization, configuration, diagnostics, and all dynamic configuration control for the sensor board. From a data processing perspective it effectively handles the media access control (MAC) layer processing and upper layers. Data received from the sensor comes directly to first GPP 401. The sensor application data is packaged in the appropriate format, stored, and transferred over a link when queried. Error correction codes are used to encode transmit data and correct bit errors in the received data. A modulation block provides channelization between piconets and can also be used as a spreading code. A data decode block keeps frame synchronization and uses the modulation codes to perform the appropriate channel decode.

Processing intensive operations are handled in first Location Engine 402. First GPP 401 in general does the decision-making about what to do with a data frame and control the timing, whereas first Location Engine 402 handles the data processing algorithms.

In a preferred embodiment, Gateway nodes (GWN) 104 support a network of:
nodes scattered in pseudo random fashion including GWN 104, FMN 102, MMR 101 and SMN 103 nodes;
Route table for IP addresses;
multiple environments above and below ground level;
Internet standard IPv4 and IPv6;
standard Internet protocols including DNS and DHCP for automatic provisioning;
Internet standard NTP for network time distribution;
Internet standard SNMP for record-keeping, fault reporting, diagnostics, application download and configuration;
providing the MIB II in accordance with RFC 1213 and registered with the Internet Assigned Numbers Authority (IANA) as a private enterprise MIB, structured in accordance with the Structure of Management Information (SMI) and its objects encoded with International Organization for Standardization's (ISO) Abstract Syntax Notation One (ASN.1) method using the Basic Encoding Rules (BER) to provide access to the functions and associated variables that support configuration, control, and monitor functions;
Internet security standards for authorization, authentication, encryption, and key management;
private key management;

advanced encryption standard (AES) encryption standards; and

FIP-140-2 Level 1 compliance.

GWN node 104 operates on WAN 409 and Wireless Mesh 100 at the same time without degradation of specified performance of any operating waveform. GWN node 104 allows automatic retransmission and routing operations between waveforms. GWN node 104 is able to receive a GPS signal from an external GPS receiver to establish location.

GWN 104 operates with commercial equipment when standard waveforms are selected. In a preferred embodiment, the Gateway Node supports data for the following wide area network waveforms:

IP over wire such as Ethernet, Cable and DSL;

IP over Fiber; and

Other WAN communication such as Satellite, Land mobile radio system, Cellular data for multiple standards, or Broadband Wireless.

The wireless voice and data network could be adapted to future developed WAN waveforms.

In a preferred embodiment, each GWN 104 supports data and voice for the following commercial Wireless Mesh waveforms and licensed Wireless Mesh waveforms with variations for the ad hoc mesh:

IEEE 802.11;

IEEE 802.15.1 (Bluetooth);

IEEE 802.15.3a (ultra wideband);

IEEE 802.15.4;

IEEE 802.15.4a (ultra wideband); and

IEEE 802.16

The wireless voice and data network could be adapted to future developed Wireless Mesh waveforms. The waveforms support quality of service (QoS) to allow mixing of data types such as data, video and digital voice on the wireless voice and data network.

In a preferred embodiment, GWN node 104 supports one or more instantiations of Wireless Mesh Network 100 waveforms and one or more instantiations of WAN 409 waveforms simultaneously. GWN node 104 may support a primary and secondary WAN 409 waveform. There is no data loss when GWN 104 switches between the primary and secondary waveforms. It automatically switches to the secondary when the primary is not available. It automatically switches from the secondary to the primary when the primary is available.

Fixed Mesh Node

Each Fixed Mesh Node 102 comprises an embedded processor, one or more mesh radios, optional Leaky Feeder radios, battery and power supply. Each node processes voice and data packets and transfers information via the wireless mesh network to other FMN's and GWN's. Each node processes voice and data packets and transfers information via the Leaky Feeder radios to a Wired Backbone 107. Network 107 is indicated as a thick line in FIG. 2 and may be implemented as a radiating coaxial cable with periodic amplifiers.

The logical decomposition of functionality of a preferred embodiment of the present invention is illustrated in FIG. 3. The embedded processor includes a second digital General Purpose Processor (GPP) 301 and second Location Engine 302. Each second mesh radio transceiver 303 includes a transmitter, receiver, RF switch and antenna connection. Each second Leaky Feeder radio transceiver 304 includes a transmitter, receiver, RF switch and antenna connection. The power interface includes backup battery 305, trickle charger/power management 306 and wired power interface 307. During the loss of prime power, FMN 102 is capable of operating on battery power and retaining all configuration parameters stored or in operation at the time.

Physical interfaces are as follows:

Power I/O includes DC power, ground, and temperature sensor to power interface;

Mesh Radio I/O includes power, ground, RF signal; and

Leaky Feeder Radio I/O includes power, ground, RF signal.

There are also board level serial and/or Ethernet connections for software development, debug and factory programming.

Second GPP 301 is the primary controller for FMN 102. From a controller perspective, it handles all power up initialization, configuration, diagnostics, and all dynamic configuration control for the sensor board. From a data processing perspective, it effectively handles the MAC layer processing and upper layers. Data received from the sensor comes directly to second GPP 301. The sensor application data is packaged in the appropriate format, stored, and transferred over a link when queried. Error correction codes are used to encode transmit data and correct bit errors in the received data. A modulation block provides channelization between piconets and can also be used as a spreading code. A data decode block keeps frame synchronization and uses the modulation codes to perform the appropriate channel decode.

Processing intensive operations are handled in second Location Engine 302. Second GPP 301 in general does the decision-making about what to do with a data frame and control the timing, whereas second Location Engine 302 handles the data processing algorithms.

In a preferred embodiment, each FMN 102 supports a network of:

nodes scattered in pseudo random fashion including GWN 104, FMN 102, MMR 101 and SMN 103 nodes;

Route table for IP addresses;

multiple environments above and below ground level.

Internet standard IPv4 and IPv6;

standard Internet protocols including DNS and DHCP for automatic provisioning;

Internet standard NTP for network time distribution;

Internet standard SNMP for record-keeping, fault reporting, diagnostics, application download and configuration;

providing the MIB II in accordance with RFC 1213 and registered with the Internet Assigned Numbers Authority (IANA) as a private enterprise MIB, structured in accordance with the Structure of Management Information (SMI) and its objects encoded with International Organization for Standardization's (ISO) Abstract Syntax Notation One (ASN.1) method using the Basic Encoding Rules (BER) to provide access to the functions and associated variables that support configuration, control, and monitor functions;

Internet security standards for authorization, authentication, encryption, and key management;

private key management;

advanced encryption standard (AES) encryption standards; and

FIP-140-2 Level 1 compliance.

FMN 102 supports data and voice for the following commercial Wireless Mesh waveforms and licensed Wireless Mesh waveforms with variations for the ad hoc mesh:

IEEE 802.11;

IEEE 802.15.1 (Bluetooth);

IEEE 802.15.3a (ultra wideband);

IEEE 802.15.4;

IEEE 802.15.4a (ultra wideband); and

IEEE 802.16

The wireless voice and data network could be adapted to future developed Wireless Mesh waveforms.

In a preferred embodiment, FMN 102 supports one or more instantiations of the Wireless Mesh waveforms. The waveforms support quality of service (QoS) to allow mixing of data types such as data, video and digital voice on the wireless voice and data network.

FMN 102 operates as a piconet coordinator. FMN 102 may include a wire or fiber Ethernet interface. FMN 102 is capable of operating on battery backup during the loss of prime power, and retaining all configuration parameters stored or in operation at the time. FMN 102 allows automatic retransmission and routing operations. FMN 102 is approved for emergency operation in an underground and hazardous environment such as a coal mine Mobile Mesh Radio Each Mobile Mesh Radio MMR 101 comprises an embedded processor, mesh radio, audio processor, keypad, display and battery. Each MMR 101 generates/receives voice and data packets and transfers information via the wireless mesh network to FMN's 102, GWN's 104. An MMR can also transfer voice and data packets directly to/from other MMR's when an FMN or GWN is not available.

The logical decomposition of functionality of a preferred embodiment of the present invention is illustrated in FIG. 5. The embedded processor is third digital General Purpose Processor (GPP) 501. Each third mesh radio transceiver 502 includes a transmitter, receiver, RF switch and antenna connection. An RF Preselector filter 503 is included to control the spectrum of operation. A removable battery 504 provides power for the unit. An audio processor 505 performs the audio encode/decode function, analog-to-digital and digital-to-analog conversions. A microphone 506, speaker 508 and amplifier 507 provide the user audio interfaces. A display device 509 and keypad 510 provide the user data interfaces.

Physical interfaces are as follows:
Power I/O includes DC power, ground, and temperature sensor to power interface;
Mesh Radio I/O includes power, ground, RF signal;
Audio I/O includes microphone in, speaker out and ground; and
Visual I/O includes keypad in and display out There are also board level serial connections for software development, debug and factory programming.

Third GPP 501 is the primary controller for MMR 101. From a controller perspective it handles all power up initialization, configuration, diagnostics, and all dynamic configuration control for the unit. From a data processing perspective it effectively handles the MAC layer processing and upper layers. Data received from the user interface comes directly to third GPP 501. The application data is packaged in the appropriate format, stored, and transferred over a link when queried. Error correction codes are used to encode transmit data and correct bit errors in the received data. A modulation block provides channelization between piconets and can also be used as a spreading code. A data decode block keeps frame synchronization and uses the modulation codes to perform the appropriate channel decode.

In a preferred embodiment, each MMR 101 supports a network of:
nodes scattered in pseudo random fashion including GWN 104, FMN 102, MMR 101 and SMN 103 nodes;
Route table for IP addresses;
multiple environments above and below ground level;
Internet standard IPv4 and IPv6;
standard Internet protocols including DNS and DHCP for automatic provisioning;
Internet standard NTP for network time distribution;
Internet standard SNMP for record-keeping, fault reporting, diagnostics, application download and configuration;
providing the MIB II in accordance with RFC 1213 and registered with the Internet Assigned Numbers Authority (IANA) as a private enterprise MIB, structured in accordance with the Structure of Management Information (SMI) and its objects encoded with International Organization for Standardization's (ISO) Abstract Syntax Notation One (ASN.1) method using the Basic Encoding Rules (BER) to provide access to the functions and associated variables that support configuration, control, and monitor functions;
Internet security standards for authorization, authentication, encryption, and key management;
private key management;
advanced encryption standard (AES) encryption standards; and
FIP-140-2 Level 1 compliance.

MMR 101 supports data and voice for the following commercial Wireless Mesh waveforms and licensed Wireless Mesh waveforms with variations for the ad hoc mesh:
IEEE 802.11;
IEEE 802.15.1 (Bluetooth);
IEEE 802.15.3a (ultra wideband);
IEEE 802.15.4;
IEEE 802.15.4a (ultra wideband); and
IEEE 802.16

The wireless voice and data network could be adapted to future developed Wireless Mesh waveforms.

In a preferred embodiment, an MMR 101 supports one or more instantiations of the Wireless Mesh waveforms. The waveforms support quality of service (QoS) to allow mixing of data types such as data, video and digital voice on the wireless voice and data network. MMR 101 also operates as a piconet coordinator or piconet client. MMR 101 is further capable of retaining all configuration parameters stored when the battery is removed. An MMR 101 supports automatic retransmission and routing operations.

Sensor Mesh Node

Each Sensor Mesh Node SMN 103 comprises an embedded processor, mesh radio, battery, power supply and sensor. Each SMN 103 generates/receives data packets and transfers information via the wireless mesh network to FMN's 102, or GWN's 104. An SMN 103 can also transfer data packets directly to/from an MMR 101 when an FMN 102 or GWN 104 is not available.

The logical decomposition of functionality of a preferred embodiment of the present invention is illustrated in FIG. 6. The embedded processor is fourth digital General Purpose Processor (GPP) 601. Each fourth mesh radio transceiver 602 includes a transmitter, receiver, RF switch and antenna connection. An RF Preselector filter 603 is included to control the spectrum of operation. The power interface includes backup battery 604, trickle charger/power management 605 and wired power interface 606. During the loss of prime power, SMN 103 is capable of operating on battery power and retaining all configuration parameters stored or in operation at the time. Sensor 607 provides measuring of environmental data for tracking one or more events. SMN 103 supports multiple sensor types such as temperature, pressure, gas, humidity, wind speed, voltage, current, lighting, chemical, biological, radiological, explosive, acoustic, magnetic, seismic, biometric, personnel state, personnel health monitoring, machine state, machine health monitoring and imaging.

Physical interfaces are as follows:
Power I/O includes DC power, ground, and temperature sensor to power interface;
Mesh Radio I/O includes power, ground, RF signal; and
Sensor I/O includes sensor input and ground.

There are also board level serial connections for software development, debug and factory programming.

Fourth GPP 601 is the primary controller for each SMN 103. From a controller perspective it handles all power up initialization, configuration, diagnostics, and all dynamic configuration control for the sensor board. From a data processing perspective it effectively handles the MAC layer processing and upper layers. Data received from the sensor comes directly to fourth GPP 601. The sensor application data is packaged in the appropriate format, stored, and transferred over a link when queried. Error correction codes are used to encode transmit data and correct bit errors in the received data. A modulation block provides channelization between piconets and can also be used as a spreading code. A data decode block keeps frame synchronization and uses the modulation codes to perform the appropriate channel decode.

In a preferred embodiment, each SMN 103 supports a network of:
- nodes scattered in pseudo random fashion including GWN 104, FMN 102, and MMR 101 nodes;
- multiple environments above and below ground level;
- Internet standard IPv4 and IPv6;
- standard Internet protocols including DNS and DHCP for automatic provisioning;
- Internet standard NTP for network time distribution;
- Internet standard SNMP for record-keeping, fault reporting, diagnostics, application download and configuration;
- providing the MIB II in accordance with RFC 1213 and registered with the Internet Assigned Numbers Authority (IANA) as a private enterprise MIB, structured in accordance with the Structure of Management Information (SMI) and its objects encoded with International Organization for Standardization's (ISO) Abstract Syntax Notation One (ASN.1) method using the Basic Encoding Rules (BER) to provide access to the functions and associated variables that support configuration, control, and monitor functions;
- Internet security standards for authorization, authentication, encryption, and key management;
- private key management;
- advanced encryption standard (AES) encryption standards; and
- FIP-140-2 Level 1 compliance.

In a preferred embodiment, SMN 103 supports data for the following commercial Wireless Mesh waveforms and licensed Wireless Mesh waveforms with variations for the ad hoc mesh:
- IEEE 802.11;
- IEEE 802.15.1 (Bluetooth);
- IEEE 802.15.3a (ultra wideband);
- IEEE 802.15.4;
- IEEE 802.15.4a (ultra wideband); and
- IEEE 802.16.

The wireless data network could be adapted to future developed Wireless Mesh waveforms.

In a preferred embodiment, SMN 103 supports one or more instantiations of the Wireless Mesh waveforms. The waveforms support quality of service (QoS) to allow mixing of data types on the wireless voice and data network. SMN 103 also operates as a piconet client on the Wireless Mesh. An SMN 103 node supports a low power sleep mode to conserve power. SMN 103 is further capable of operating on battery backup during the loss of prime power, and retaining all configuration parameters stored or in operation at the time. SMN 103 allows automatic retransmission operations.

Node General Characteristics

All nodes have enough memory to support download of a new waveform without affecting operation of current waveforms. All waveforms are down-loadable, locally and over the air, and stored in non-volatile memory.

In general, regardless of type, all nodes have safeguards to reduce the possibility of unintentional reprogramming and to preclude the possibility of software storage errors. The operator is notified when a local or over the air download has successfully completed or failed. Waveforms are authenticated when they are locally or over the air downloaded into a sensor node. All nodes have storage capacity to store presets and configuration information for each waveform stored. Provisions are included to prevent instantiating a waveform to an improperly configured channel. Each node provides positive confirmation to the operator following each successful instantiation. All node types support:
- automatic provisioning;
- network time distribution;
- record-keeping, fault reporting, diagnostics, application download and configuration;
- built-in test and diagnostics to verify operation;
- amplitude, frequency, spatial and time discrimination techniques for interference and jamming;
- channel configuration/reconfiguration within the specified combinations of waveforms identified;
- changing a channel waveform;
- changing the channel operating parameters;
- monitoring channel performance;
- turning a channel on/off without affecting the operation of other waveforms; and
- automatic power control to minimize interference with other nodes.

After an unexpected power loss, or operator controlled shut down, and upon restoration of power to the radio set(s), each node is capable of completing a components diagnostics test and automatic recovery. A node transmitter sustains no damage when the RF output port(s) is open or shorted. A node allows the operator to load time manually or over-the-air.

4. Node Management

Figure 7:
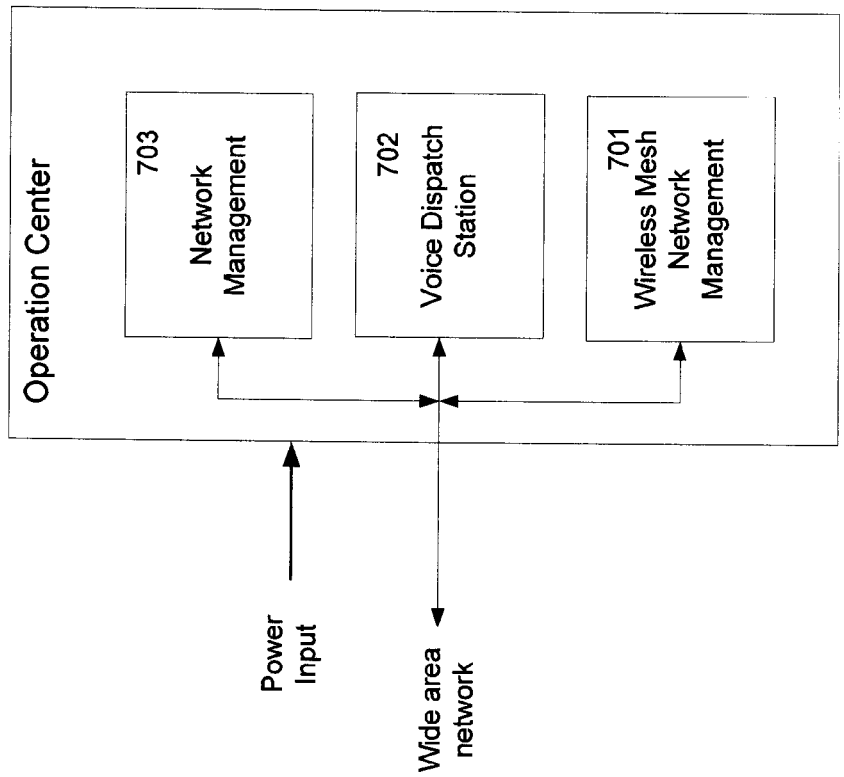
FIG. 7 illustrates the concept of a Wireless Mesh Network Management in a logical design block diagram view according to an embodiment of the present invention.

In a preferred embodiment the present invention includes an Operations Center 105 with a Wireless Mesh Network Management function 701, as shown in FIG. 7, that provides supervision, status and configuration that is unique to operation of Wireless Mesh Network 100. This may include such functions as Dynamic Host Configuration Protocol address assignment, Simple Network Management Protocol (SNMP) for device configuration and status, security through an Electronic Key Management System and over-the-air reprogramming (OTAP). Encryption for unattended devices is limited to Type III algorithms such as the advanced encryption standard (AES).

This invention also provides a method for managing a system of multi-waveform nodes within at least one wireless mesh network (WMN) 100 incorporating at least one fixed gateway node 104 and a combination of a plurality of stationary and mobile nodes wherein all of the nodes communicate through RF links. This system and method are particularly suited to use in a hazardous or underground area. According to this method, site planning is initially performed to determine the optimum location of the at least one gateway node 104 and stationary nodes based on signal strength of RF links and traffic profiles. Each node is configured to provide the combination of waveforms and features to be supported by the system. The location of mobile nodes is calculated using a geolocation algorithm. This algorithm is based on received signal strength or time of arrival of signals from neighbor nodes to determine the relative location of a mobile node. The geolocation algorithm has two parts: a ranging algorithm and a positioning algorithm. Ranging is the measurement of distance between two nodes based on RSSI (RF signal strength) or time delay. Ranging algorithms are well known in the art and have been published in open literature. Positioning is the filtering of multiple ranging measurements to develop an accurate location measurement. Such filtering techniques are also well known in the art. Prior to system operation commencement, it is assumed that the traffic pattern, i.e. the usage or loading of each FMN 102, is uniform. There is background traffic associated with network operation and user traffic. Background traffic is fairly constant and is dependent on the number of neighbor nodes which is predictable. User traffic varies with the number of users (people with MMRs 101) which is typically measured as average usage and peak usage. Each FMN 102 has multiple paths to a Gateway 104. The goal in an ad hoc mesh is to minimize the number of hops to Gateway 104 while maintaining a reliable link because each hop adds latency and increases loading on each FMN 102 in the path. User traffic can be modified by changing configuration parameters and the physical location of a Gateway 104 and FMNs 102. After operation commences, the functioning of each WMN 100 is supervised to ensure both reliable operation of nodes located therein as well as the traffic pattern within each WMN 100 to identify congestion. The traffic pattern in the system does not remain uniform but rather changes over time. If the peak usage exceeds capacity, the primary path from an FMN 102 to a Gateway 104 can be changed from the WMN manager in Operations Center 105 to reduce loading, an FMN location can be moved or an FMN can be added. Each option affects the traffic pattern with the goal of reducing latency and peak usage on each FMN. Thus, the WMN traffic pattern is monitored at the network manager in Operations Center 105, and the network configuration can be modified as needed to improve WMN performance. Supervision includes operator displays at multiple levels enabling a user to drill down from the network level to the node level. If congestion is found or if unreliable nodes are identified, WMN 100 is reconfigured using a specified combination of identified waveforms. Reconfiguration of nodes can take one or more forms such as changing a channel waveform, changing the channel operating parameters; turning a channel on/off without affecting the operation of other waveforms and over-the-air reprogramming and/or rekeying. In addition, changing the location of fixed nodes, gateway nodes, node RF link connections, node waveform, node RF spectrum may occur during reconfiguration. Furthermore, power levels may be modified to minimize interference with other nodes. SNMP is used for record-keeping, fault reporting, diagnostics, application downloads and the configuration/reconfiguration process. Internet security standards are provided for authorization, authentication, encryption and key management. With regard to security, advanced encryption standard (AES) is used wherever possible as are private key management and distribution. Standard interfaces, such as XML, are provided in Operations Center 105 between WMN manager 701 and voice dispatch station 702 and network manager 703.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt the teaching of the present invention to a particular situation without departing from its central scope. Therefore it is intended that the present invention not be limited to the particular embodiments disclosed as the best mode contemplated for carrying out the present invention, but that the present invention include all embodiments falling within the scope of the appended claims.

What is claimed is:

1. A system for the creation of a reliable wireless ad hoc mesh network architecture and protocol to support normal and emergency operation of voice, data and location communication for underground, industrial and other hazardous environments using a single wideband platform, the system comprising:

a network architecture based on localized clusters of intrinsically safe autonomous nodes capable of ad hoc interconnection with nearby nodes and connection to gateway nodes resulting in an ad hoc wireless mesh network (WMN) topology where each gateway node, fixed mesh node (FMN) and mobile node contains an ad hoc mesh network protocol for automatic formation of a network topology, power control, and maintenance of reliable link connections within a network;

a reliable and secure radio frequency (RF) physical layer with an ad-hoc networking data link layer that is self-configuring, energy efficient, and scaleable to variable size networks capable of providing reliable communications for a wireless voice and data network;

wherein the ad hoc wireless mesh network (WMN) topology comprises fixed mesh nodes with approximately 50% coverage overlap between nodes to provide a reliable communication network where each cluster of nodes transfers digital voice and data either directly or through multi-hop transactions for mobile nodes carried by personnel and intrinsically safe sensor mesh nodes (SMNs) that are fixed or mobile; location of stationary nodes are optimized based on signal strength of radio frequency (RF) links and a traffic profile in a manner that if a nearest neighbor node becomes incapacitated, there is sufficient transmit power and receive sensitivity to connect with a next nearest neighbor; and wherein there are numerous paths in the wireless mesh network, including multiple paths to ultimately connect to decision-making authorities to ensure critical communications are achieved;

wherein the ad hoc wireless mesh network (WMN) includes protocol for dispatch operation, emergency operation, remote supervision, tracking of personnel, remote status, asset control, machine state of health and operational management is capable of being managed by way of a Gateway node connected to an operations center by way of a wide area network; and wherein tracking of personnel carrying mobile mesh radios (MMR) and mobile nodes is determined by way of triangulation methods based on signal strength and/or time of arrival measurements relative to nearest active fixed mesh nodes in order for surface personnel to determine location of any person underground.

2. The system of claim 1 wherein said operations center includes supervision, status and configuration of the Wireless Mesh Network using the ad hoc mesh network protocol with quality of service to enable voice and text messaging communications with personnel carrying said mobile mesh radios (MMR), relative location of mobile nodes, operational status of underground equipment, real-time sensor measurement data to determine condition of the underground hazardous environment and remote management of the underground equipment.

3. The system of claim 1 wherein reliable operation is provided between the above-ground wide area network and an underground network by locating at least one of said Gateway nodes above ground or sufficiently away from the hazardous area to provide an interface to the underground communication system using the ad hoc mesh network protocol and an above-ground wide area network (WAN) interface using a standard Ethernet interface with Internet Protocol (IP):

wherein the Gateway node includes all functions of an FMN and the wide area network interface;
  wherein the Gateway node provides transparent communications across different physical layers;
  wherein each Gateway node processes Wireless Mesh Network voice and data packets and transfers information between the WMN and wide area network using quality of service;
  wherein the Gateway operation allows underground personnel with MMR's to continue communication with each other and with Sensor Mesh Nodes (SMN's) independent of the above ground connection;
  wherein the locations of the Gateway nodes are optimized based on signal strength of the radio frequency (RF) links and the traffic profile;
  wherein the Gateway node supports one or more instantiations of Wireless Mesh Network waveform and one or more instantiations of WAN waveforms simultaneously;
  wherein there is no data loss when the Gateway node automatically switches between the primary and secondary waveforms.

4. The system of claim 1 wherein WMN node configuration parameters and software can be dynamically re-assigned and reconfigured by way of one of said gateway nodes or an access point to the wide area network:

wherein reconfiguration of nodes can take one or more forms selected from changing a channel waveform; changing the channel operating parameters; or turning a channel on/off without affecting the operation of other waveforms, over-the-air reprogramming and/or rekeying; and
  wherein one or more of changing the location of fixed nodes, gateway nodes, node RF link connections, node waveform, or node RF spectrum is capable of occurring during reconfiguration; and
  wherein power levels are capable of being modified to minimize interference with other nodes.

5. The system of claim 1 wherein each of said at least one intrinsically safe sensor mesh nodes includes the wireless ad hoc mesh network protocol and is capable of collecting data to provide real-time conditions in the underground environment and of equipment located therein from one or more intrinsically safe sensors selected from the group consisting of temperature, pressure, gas, humidity, wind speed, voltage, current, lighting, chemical, biological, radiological, explosive, acoustic, magnetic, seismic, biometric, personnel state, personnel health monitoring, machine state, machine health monitoring and imaging and is capable of transmitting that data to the at least one underground wireless mesh network.

6. The system of claim 1 wherein each of said at least one intrinsically safe sensor mesh nodes is capable of communicating by way of the ad hoc mesh network protocol with any one or more of said fixed mesh nodes, said at least one gateway node or said at least one mobile mesh radio to provide real-time data, wherein SMN's are placed where needed to monitor conditions over a wide enough area to provide capability to rapidly detect, locate, characterize, report, track, and respond to events, especially a localized explosion, fire, flood, or collapse.

7. The system of claim 1 wherein each of said at least one mobile mesh radios is capable of communicating by way of the ad hoc mesh network protocol with any one or more of said fixed mesh nodes, said at least one gateway node and another of said at least one mobile mesh radios so as to provide two-way radio emergency voice and text communications to personnel located underground;

Wherein MMR's are capable of communicating with other MMR's and SMN's in talk-around mode to allow local communication when out of range of an FMN;
  wherein an MMR can act as a relay link between another MMR and an FMN, or between an SMN and an FMN to extend communication range.

* * * * *